United States Patent
May et al.

(10) Patent No.: US 9,042,499 B2
(45) Date of Patent: May 26, 2015

(54) RADIO FREQUENCY (RF) RECEIVERS WITH WHITENED DIGITAL CLOCKS AND RELATED METHODS

(71) Applicant: Silicon Laboratories Inc., Austin, TX (US)

(72) Inventors: Michael R. May, Austin, TX (US); Scott T. Haban, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/062,958

(22) Filed: Oct. 25, 2013

(65) Prior Publication Data

US 2015/0117573 A1  Apr. 30, 2015

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04B 1/12 | (2006.01) |

(52) U.S. Cl.
CPC ........................................ *H04B 1/12* (2013.01)

(58) Field of Classification Search
CPC   H03H 17/0219; G06F 7/582; H04L 2209/08; H04L 9/0662
USPC .......................................... 375/346, 351, 359
See application file for complete search history.

(56) References Cited

U.S. PATENT DOCUMENTS

| | | | |
|---|---|---|---|
| 6,130,578 | A | 10/2000 | Tang |
| 6,791,382 | B1 | 9/2004 | Ting et al. |
| 7,193,481 | B2 | 3/2007 | Luzzi |
| 7,272,373 | B2 | 9/2007 | Tuttle et al. |
| 7,471,940 | B2 | 12/2008 | Tuttle et al. |
| 7,515,076 | B1 | 4/2009 | Singh et al. |
| 7,570,182 | B2 | 8/2009 | Sheba et al. |
| 7,920,006 | B1 | 4/2011 | Keramat et al. |
| 7,924,193 | B2 | 4/2011 | Lin et al. |

(Continued)

OTHER PUBLICATIONS

Patent Application, May et al., "Radio Frequency (RF) Receivers Having Whitened Digital Frame Processing and Related Methods", U.S. Appl. No. 14/301,764, filed Jun. 11, 2010, 25 pgs.

*Primary Examiner* — Shuwang Liu
*Assistant Examiner* — Sung Ahn
(74) *Attorney, Agent, or Firm* — Egan, Peterman & Enders LLP.

(57) ABSTRACT

Radio frequency (RF) receivers having whitened digital clocks and related methods are disclosed. Disclosed embodiments generate whitened clocks having random variations that are used to operate digital processing blocks so that interference created by the whitened clocks is seen as white noise within the received RF signal spectrum. RF input signals are received by RF front-ends (RFFEs) that output analog signals associated with channels within the RF input signals. These analog signals are converted to digital information and processed by digital receive path circuitry that outputs digital data associated with the channel. The digital receive path circuitry includes a whitened clock generator that generates a whitened clock having random variations and which a digital processing block that operates based upon the whitened clock. Further, the RFFE and the digital receive path circuitry are located within a single integrated circuit.

27 Claims, 6 Drawing Sheets

(56) References Cited

U.S. PATENT DOCUMENTS

| | | |
|---|---|---|
| 7,987,382 B2 | 7/2011 | Badaroglu |
| 8,331,887 B2 | 12/2012 | Tuttle et al. |
| 8,548,031 B2 | 10/2013 | Djadi et al. |
| 2002/0138780 A1* | 9/2002 | Bock .............................. 713/500 |
| 2006/0073793 A1* | 4/2006 | Welland et al. ................. 455/86 |
| 2008/0118013 A1* | 5/2008 | Vis et al. ........................ 375/354 |
| 2008/0119230 A1* | 5/2008 | Guda et al. ................. 455/562.1 |
| 2011/0115537 A1* | 5/2011 | May et al. ...................... 327/170 |
| 2011/0150045 A1* | 6/2011 | Thompson et al. ........... 375/147 |
| 2011/0158298 A1 | 6/2011 | Djadi et al. |
| 2011/0181325 A1 | 7/2011 | May et al. |
| 2012/0075134 A1* | 3/2012 | Rogers et al. ................. 341/155 |
| 2012/0099625 A1 | 4/2012 | Djadi et al. |

* cited by examiner

RADIO FREQUENCY (RF) RECEIVERS WITH WHITENED DIGITAL CLOCKS AND RELATED METHODS

TECHNICAL FIELD OF THE INVENTION

This invention relates to radio frequency (RF) receivers and clock systems for RF receivers.

BACKGROUND

Current radio frequency (RF) receiver integrate circuits (ICs) often convert analog signals associated with a receive channel to digital data and then perform digital processing on this digital data. As part of this digital processing, digital clocks are utilized to operate the digital processing blocks. These digital clocks, however, can generate undesirable on-chip noise and interference within the broadcast channels being received. Where the channel to be received is known, frequency planning can be used to adjust digital clock frequencies among a number of specific clock frequencies such that interfering harmonics fall outside the frequency range for the channel to be tuned. However, where multiple channels are to be tuned from one or more frequency bands, this frequency planning becomes extremely difficult to implement due to the number of possible combinations of channels to be received.

SUMMARY OF THE INVENTION

Radio frequency (RF) receivers having whitened digital clocks and related methods are disclosed. Disclosed embodiments generate whitened clocks having random variations that are used to operate digital processing blocks so that interference created by the whitened clocks is seen as white noise within the received RF signal spectrum. RF input signals are received by RF front-ends (RFFEs) that output analog signals associated with channels within the RF input signals. These analog signals are converted to digital information and processed by digital receive path circuitry that outputs digital data associated with the channel. The digital receive path circuitry includes a whitened clock generator that generates a whitened clock having random variations and a digital processing block that operates based upon the whitened clock. Further, the RFFE and the digital receive path circuitry are located within a single integrated circuit. Other features and variations could also be implemented, as desired, and related systems and methods can be utilized, as well.

For one embodiment, a receiver system having whitened digital processing including a radio frequency (RF) front-end configured to receive RF input signals and to output analog signals associated with a channel within the RF input signals, and digital receive path circuitry configured to receive the analog signals, to convert the analog signals into digital information, to process the digital information, and to output digital data associated with the channel, where the digital receive path circuitry includes a whitened clock generator configured to generate a whitened clock having random variations and a digital processing block configured to operate based upon the whitened clock, and where the RF front-end and the digital receive path circuitry are integrated within a single integrated circuit.

In further embodiments, the receiver system further includes one or more additional receive paths configured to receive RF input signals. In addition, the additional receive paths can be configured to loop at least a portion of the RF input signals through to an external interface for the integrated circuit. The digital receive path circuitry can also be configured to output a whitened output clock to an external interface for the integrated circuit where the whitened output clock being based upon the whitened clock.

In other embodiments, the digital processing block can include a buffer coupled to a digital processor. Further, the buffer can be configured to receive input data based upon a data input clock and to output buffered data based upon the whitened clock. Still further, the input data can be digital data output by an analog-to-digital converter, and the digital processor can be configured to receive the buffered data and to operate based upon the whitened clock. In addition, the input data can be digital data output by the digital processor, and the buffered data can be provided to an external interface for the integrated circuit. In additional embodiments, the buffer can be configured to receive input data based upon the whitened clock and to output buffered data based upon a data output clock. In addition, the buffered data can be coupled to a digital-to-analog converter configured to operate based upon the data output clock.

In additional embodiments, the whitened clock generator can include a randomizer configured to provide random values and a clock generator configured to receive the random values and to output the whitened clock. In addition, the randomizer can be a random number generator and an integrator. Still further, the clock generator can include a nominal clock control block configured to generate nominal control parameters, a combiner configured to combine the nominal control parameters with the random value to generate whitened control parameters, and a digital clock generator configured to output the whitened clock based upon the whitened control parameters. In further embodiments, the randomizer can be configured to receive error control parameters configured to constrain the random value. In addition, the error control parameters can include at least one of a clock period constraint parameter and a clock phase constraint parameter.

In still further embodiments, the clock generator can be configured to output a divided clock signal that is a divided version of an input clock signal, and the divided clock signal can be based upon a selected number of half cycles of the input clock signal. In addition, the randomizer can be configured to generate random numbers, and the clock generator can be configured to combine the random numbers with nominal values to whiten the selected number of half cycles as the clock generator operates.

For another embodiment, a method is disclosed for whitened processing of digital information within a receiver system including receiving radio frequency (RF) input signals, converting the analog signals associated with a channel within the RF input signals into digital information, generating a whitened clock having random variations, processing the digital information using the whitened clock, and outputting digital data associated with the channel, where the receiving, converting, generating, processing, and outputting steps are performed within a single integrated circuit.

In further embodiments, the method includes receiving RF input signals using multiple receive paths within the single integrated circuit. In addition, the method can further include outputting a whitened output clock to an external interface for the integrated circuit, the whitened output clock being based upon the whitened clock.

In other embodiments, the processing step can include using a buffer and a digital processor to process the digital information. Further, the method can include using the buffer to receive input data based upon a data input clock and using the buffer to output buffered data based upon the whitened clock. Still further, the method can include using digital data from an analog-to-digital converter to provide the input data to the buffer, using the digital processor to receive the buffered data, and operating the digital processor based upon the whitened clock. In addition, the method can include using digital data from the digital processor to provide the input data to the buffer and providing the buffered data to an external interface for the integrated circuit. In additional embodiments, the method can further include using the buffer to receive input data based upon the whitened digital clock and to output data based upon a data output clock. In addition, the method can further include providing the buffered data to a digital-to-analog converter and operating the digital-to-analog converter based upon the data output clock.

In additional embodiments, the generating step can include generating whitened control parameters and applying the whitened control parameters to a digital clock generator to generate the whitened clock. In addition, the method can include utilizing a random number generator to generate random values and using the random values to generate the whitened control parameters. Still further, the method can include applying error control parameters to constrain the whitened control parameters.

In still further embodiments, the generating step can include generating a divided clock signal that is a divided version of an input clock signal where the divided clock signal being based upon a selected number of half cycles of the input clock signal.

Other features and variations can be implemented, if desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Radio frequency (RF) receivers having whitened digital clocks and related methods are disclosed. Disclosed embodiments generate whitened clocks that are used to operate digital processing blocks so that interference that is created by the whitened clocks is seen as white noise within the received RF signal spectrum. Different features and variations can be implemented for the embodiments described herein, and related systems and methods can be utilized, as well.

Figure 1:
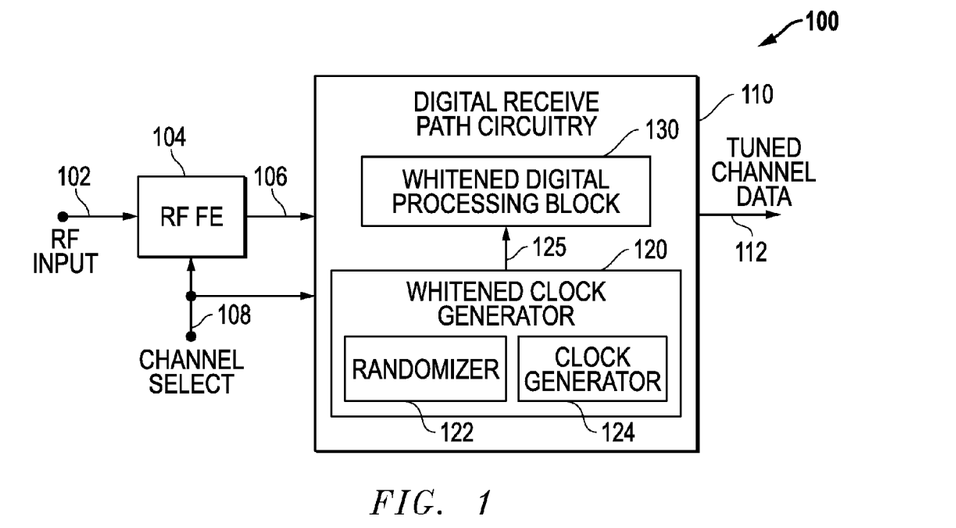
FIG. 1 is a block diagram of an example embodiment for an radio frequency (RF) receiver system including an RF front end and digital receive path circuitry having a whitened digital processing block.

FIG. 1 is a block diagram of an example embodiment for an RF receiver system 100 including an RF front end (RFFE) 104 and digital receive path circuitry 110 having a whitened digital processing block 130. The RFFE 104 is configured to receive an RF input 102, for example, an RF signal spectrum received from an antenna. The RFFE 104 can also be configured to receive a channel select signal 108 that determines the channel within the RF signal spectrum that will be tuned by the RF receiver system 100. For example, the channel can be one of a number of different channels broadcast within a frequency band (e.g., AM radio, FM radio, television broadcasts, etc.). The RFFE 104 outputs analog signals 106 associated with the channel to be tuned. The digital receive path circuitry 110 converts these analog signals 106 into digital information that is then digitally processed to generate channel data 112 that can be output to additional circuitry and/or processing blocks. The digital receive path circuitry 110 in part includes whitened digital processing block 130 and a whitened clock generator 120. The whitened clock generator 120 includes a randomizer 122 and a clock generator 124, and the whitened clock 125 output by the whitened clock generator 120 is utilized for the operation of at least a part of the digital processing within the digital receive path circuitry 110 to form the whitened digital processing block 130.

As described herein, the whitened clock 125 is whitened in that intentional random variations are introduced to its clock phase and/or period so that interference generated by the whitened clock 125 and its harmonics within the channel to be tuned will appear to be white noise. Further, one or more whitened clocks can be generated and used by the whitened digital processing block 130. The whitened nature of the whitened clocks effectively reduce or eliminate the effects of interfering signals that might otherwise be generated by digital clock signals within received channel frequencies if non-whitened digital clocks were utilized.

It is noted that the randomizer 122 can utilize a random number generator to introduce random variations within the whitened clock 125. Further, the random number generator can be implemented using a linear feedback shift register (LFSR) or using some other desired technique. It is also understood that the random numbers generated can be non-ideal in that they repeat after some interval. It also is noted that the tuned channel data 112 can be real (I) and imaginary (Q) components of a complex digital data that has been down-converted to baseband (e.g., DC or 0 Hertz). It is further noted that a wide variety of architectures can be utilized for the RFFE 104 and the digital receive path circuitry 110 while still utilizing the whitened digital clock techniques described herein. For example, dual down-conversion, low-IF down-conversion, direct down conversion, direct spectrum digitization without down conversion, and/or other desired architectures could be utilized for the RFFE 104. It also is noted that the RF receiver system 100 can be configured to receive channels within frequency bands across a wide range of frequencies, from thousands of Hertz to gigahertz frequencies and above. The content within the channels for the received frequency bands can include audio, video, data, and/or other desired content.

Figure 2:
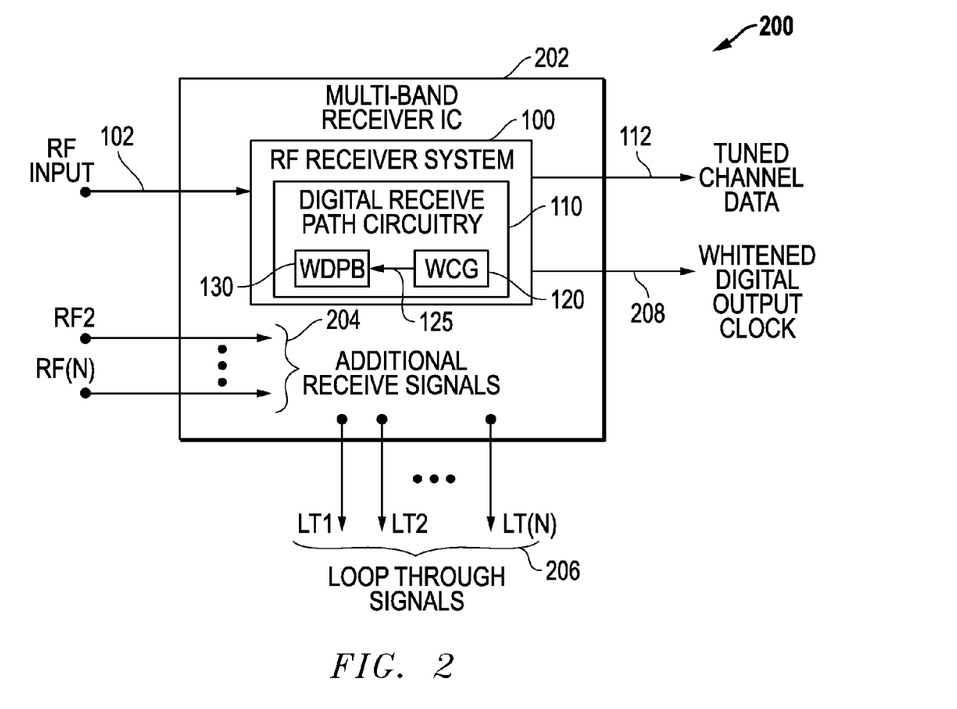
FIG. 2 is a block diagram of an example embodiment for a multi-band receiver integrated circuit (IC) that includes an RF receiver system 100 having digital receive path circuitry 110, which in turn includes a whitened digital processing block and a whitened clock generator.

FIG. 2 is a block diagram of an example embodiment for a multi-band receiver integrated circuit (IC) 202 that includes an RF receiver system 100 having digital receive path circuitry 110, which in turn includes a whitened digital processing block (WDPB) 130 and a whitened clock generator (WCG) 120. As described above, the RF receiver system 100 receives the RF input 102 and outputs tuned channel data 112 that can be provided to external circuitry and/or processing blocks. The RF receiver system 100 can also provide a whitened digital output clock 208 that is equal to or a divided/multiplied version of the whitened clock 125. This whitened digital output clock 208 can also be provided as an output to external circuitry and/or processing blocks. As depicted, in addition to RF input 102, the multi-band receiver IC 202 is also configured to receive one or more additional RF inputs (RF2 . . . RF(N)) 204 as additional receive signals that can be tuned and/or otherwise processed by the RF receiver system 100. For example, the RF input 102 and/or one or more of these additional RF inputs (RF2 . . . RF(N)) 204 can be output as one or more loop through signals (LT1, LT2 . . . LT(N)) 206 to external circuitry and/or processing blocks. The loop through signals (LT1, LT2 . . . LT(N)) 206 can be amplified or unamplified versions of the RF inputs 102/204 that are essentially passed through the multi-band receiver IC 202 for tuning and digital processing by additional circuitry and/or processing blocks. Filters and/or other circuit blocks can also be applied to the RF inputs 102/204 prior to their being output as loop through signals (LT1, LT2 . . . LT(N)) 206. Other processing could also be applied to the additional RF inputs (RF2 . . . RF(N)) 204, as desired.

It is noted that having additional RF inputs (RF2 . . . RF(N)) 204 within the multi-band receiver IC 202 for which channels will be tuned, either on-chip or off-chip by processing blocks that receive the loop through signals (LT1, LT2 . . . LT(N)), increases the likelihood that non-whitened digital clocks would generate interfering tones that would fall within desired channels to be tuned. Advantageously, the whitened digital processing blocks 130 described herein, which operate using whitened clocks 125 from whitened clock generators 120 as described herein, mitigate and effectively remove these interfering tones by causing them to be seen as white noise within the signal spectrum.

Figure 3:
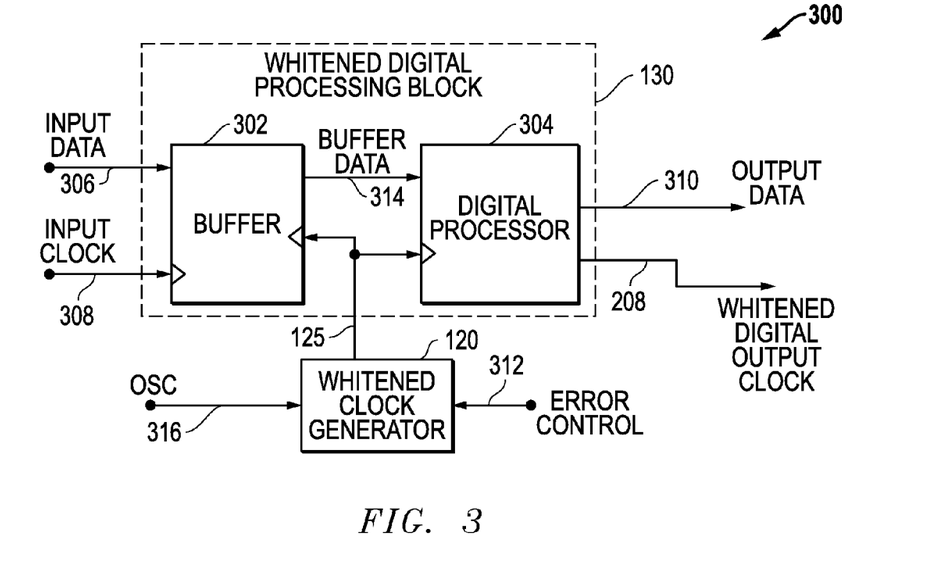
FIG. 3 is a block diagram of an example embodiment for digital receive path circuitry including a whitened digital processing block and a whitened clock generator.

FIG. 3 is a block diagram of an example embodiment 300 for digital receive path circuitry including a whitened digital processing block 130 and a whitened clock generator 120. The whitened digital processing block 130 includes a buffer 302 and a digital processor 304. The buffer 302 is configured to receive input data 306 and an input clock 308. The input clock 308 determines the timing at which the buffer 302 stores input data 306. The buffer 302 also receives the whitened clock 125 as an output clock that determines when buffered data 314 is output by the buffer 302 to the digital processor 304. The digital processor 304 receives the buffered data 314 and processes this data using the whitened clock 125. The digital processor 304 generates processed output data 310 that can be provided to additional on-chip or off-chip processing blocks, as desired. Further, the digital processor 304 can also output a whitened digital output clock 208 based upon the whitened clock 125 (e.g., equal to or a divided/multiplied version of the whitened clock). The whitened clock generator 120 can be further configured to receive an oscillation signal (OSC) 316 that is used by the whitened clock generator 120 to generate whitened clock 125. Further, the whitened clock generator 120 can also be configured to receive one or more error control parameters 312 that constrain the randomness of the whitened clock 125.

It is noted that the buffer 302 can be implemented using a FIFO (first-in-first-out) buffer and/or other desired buffer implementations that allow for input data to be clocked at a different rate than output data. It is further noted that the error control parameters 312 can constrain the deviations in the whitened clock 125 so that there is a limit to the magnitude of these variations. For example, variations in the period and/or phase of the whitened clock 125 can be limited to a maximum period error and/or a maximum phase error, as described further below. Different and/or additional random variations and related error constraints can also be utilized, if desired, while still utilizing error control parameters 312 to limit the randomness of the whitened clock 125.

Figure 4:
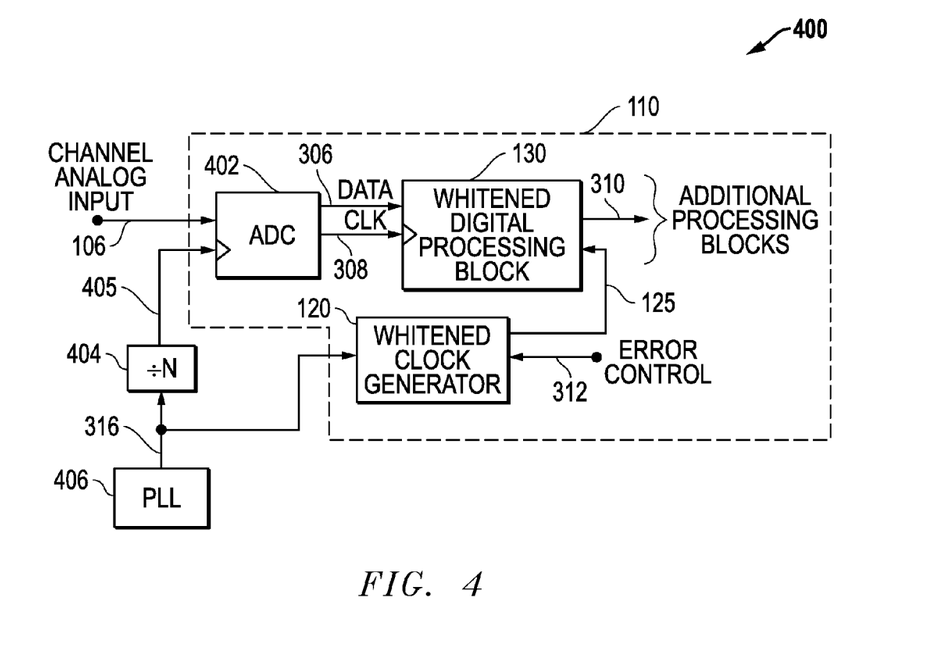
FIG. 4 is a block diagram of an example embodiment for digital receive path circuitry where a whitened clock is used with respect to an analog-to-digital converter.

FIG. 4 is a block diagram of an example embodiment 400 for digital receive path circuitry where a whitened clock is used with respect to an analog-to-digital converter (ADC) 402. The ADC 402 receives an analog input 106 associated with the channel being tuned. The ADC 402 also receives an input clock 405 that is generated by passing an oscillation signal (OSC) 316 generated by PLL (phase lock loop) 406 through divide-by-N block (÷N) 404. The ADC 402 operates to convert the analog input 106 into digital data 306 that is provided to the whitened digital processing block 130 along with a digital clock 308 associated with the digital conversion sampling rate. The whitened digital processing block 130 uses the digital clock 308 as an input clock for digital data 306. The whitened digital processing block 130 processes the digital data 306 using the whitened clock 125 and outputs data 310 that can be provided to additional processing blocks, as desired. The whitened clock generator 120 receives the oscillation signal (OSC) 316 and the error control parameters 312 and generates the whitened clock 125 that is provided to the whitened digital processing block 130.

Figure 5:
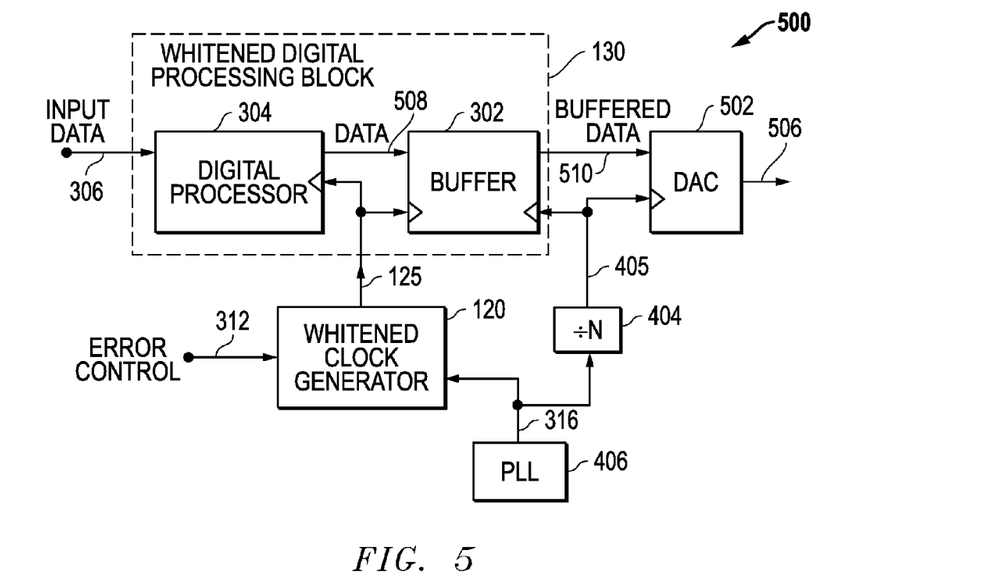
FIG. 5 is a block diagram of an example embodiment for digital receive path circuitry where a whitened clock is used with respect to a digital-to-analog converter.

FIG. 5 is a block diagram of an example embodiment 500 for digital receive path circuitry where a whitened clock is used with respect to a digital-to-analog converter (DAC) 502. The whitened digital processing block 130 includes a digital processor 304 and a buffer 302. The digital processor 304 receives the input data 306 and process this input data 306 using the whitened clock 125. The processed data 508 is provided to the buffer 302, which utilizes the whitened clock 125 as an input clock for this processed data 508. The buffer 302 then outputs buffered data 510 to the DAC 502 using a clock 405 as an output clock. As above, the clock 405 is generated by passing the oscillation signal (OSC) 316 generated by PLL (phase lock loop) 406 through divide-by-N block (÷N) 404. The DAC 502 receives the buffered data 510 using the clock 405 as an input clock and outputs analog signals 506. The whitened clock generator 120 receives the oscillation signal (OSC) 316 and the error control parameters 312 and generates the whitened clock 125 that is provided to the digital processor 304 and the buffer 302.

Figure 6:
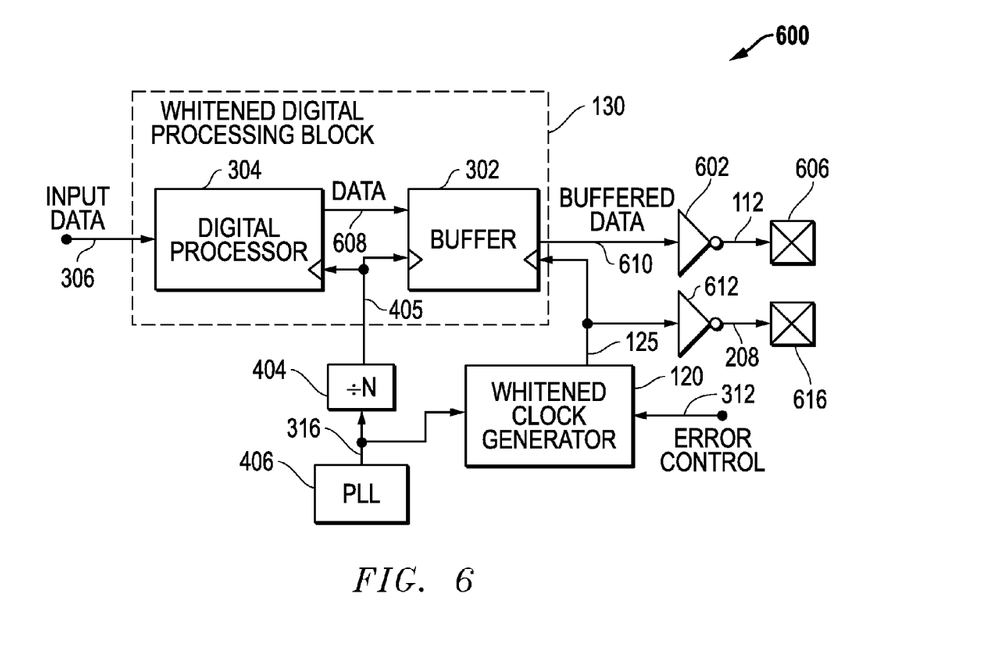
FIG. 6 is a block diagram of an example embodiment for digital receive path circuitry where a whitened clock is used with respect to an output data pad.

FIG. 6 is a block diagram of an example embodiment 600 for digital receive path circuitry where a whitened clock is used with respect to an output data pad 606. The whitened digital processing block 120 includes a digital processor 304 and a buffer 302. The digital processor 304 receives the input data 306 and process this input data 306 using clock 405. The processed data 608 is provided to the buffer 302, which utilizes the clock 405 as an input clock for this processed data 508. The buffer 302 then outputs buffered data 610 to the output driver 602 using the whitened clock 125 as an output clock. The output driver 602 outputs data 112 to a data output pad 606 for the receiver integrated circuit. As above, the clock 405 is generated by passing an oscillation signal (OSC) 316 generated by PLL (phase lock loop) 406 through divide-by-N block (÷N) 404. The whitened clock generator 120 receives the oscillation signal (OSC) 316 and the error control parameters 312 and generates the whitened clock 125 that is provided to the buffer 302. The whitened clock 125 can also be provided to an output driver 612, and the output driver 612 can output the whitened output clock 208 to a clock output pad 616.

It is noted that a single PLL 406 in FIGS. 4-6 is shown as providing the oscillation signal (OSC) 316 that is used to generate the clock 405 and that is used to provide a base clock signal to the whitened clock generator 120. It is further noted that one or more additional and/or different oscillation blocks can also be utilized, as desired, to provide these oscillation signals. For example, rather than sharing a single PLL, a second PLL could be utilized to generate the base clock signal provided to the whitened clock generator 120. As another example, the clock 405 could be generated by a circuit that includes another instance of the whitened clock generator 120. Other variations could also be implemented, as desired.

Figure 7:
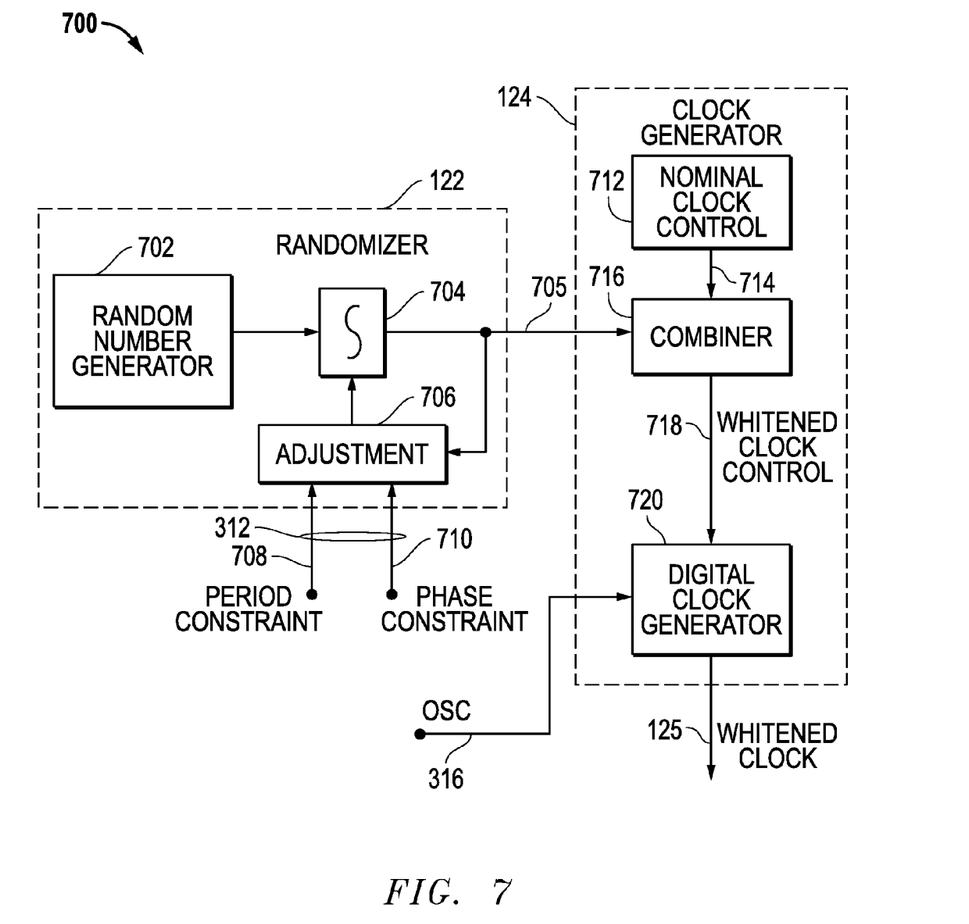
FIG. 7 is a block diagram of an embodiment for a whitened clock generator that includes a randomizer and a whitened clock generator.

FIG. 7 is a block diagram of an embodiment 700 for whitened clock generator that includes a randomizer 122 and a clock generator 124. The randomizer 122 includes a random number generator 702 that is configured to provide a random number with a random sign (i.e., positive or negative) to integrator 704. Integrator 704 is configured to integrate the random numbers over time and to provide the resulting integrated random number 705 to combiner 716 within the clock generator 124. A feedback adjustment block 706 receives the resulting integrated random number 705 as well as error control parameters 312 and operates to constrain the integrated random number in order to limit the extent to which the integrated random number 705 can vary. For example, the error control parameters 312 can include a period constraint parameter 708 that determines the limits to which the resulting random number 705 can vary the clock period for the whitened clock 125. The error control parameters 312 can also include a phase constraint parameter 710 that determines the limits to which the resulting random number 705 can vary the phase for the whitened clock 125. Additional and/or different constraints and related parameters could also be utilized. The clock generator 124 includes a nominal clock control block 712 that provides nominal clock control parameters 714 to the combiner 716. The combiner 716 combines the nominal clock control parameters 714 with the integrated random number 705 to generate whitened clock control parameters 718 that vary over time based upon variations in the integrated random number 705. The digital clock generator 720 receives the whitened clock control parameters 718, receives the oscillation signal (OSC) 316 as a base clock signal, and generates the whitened clock 125.

Figure 8:
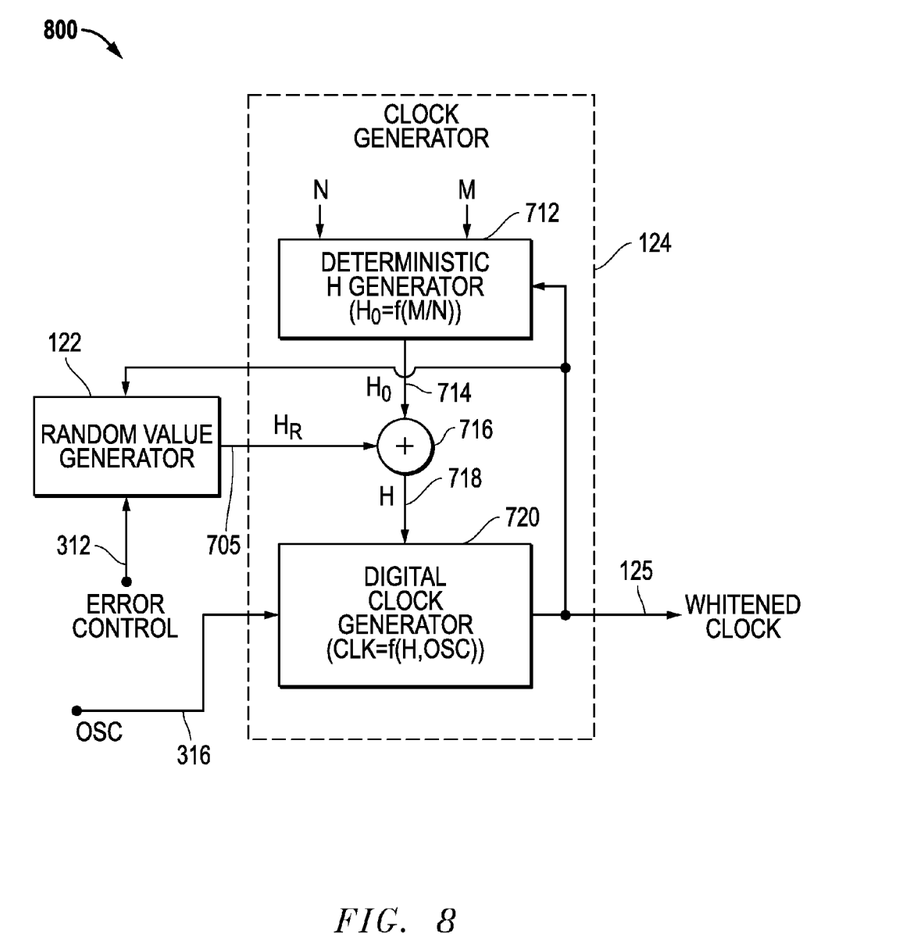
FIG. 8 is a block diagram of a further embodiment for a whitened clock generator where the whitened clock is varied based upon a randomized half-cycle count value (H).

FIG. 8 is a block diagram of a further embodiment 800 for whitened clock generator where the whitened clock 125 is varied based upon a randomized half-cycle count value (H). The clock generator 124 includes a deterministic value generator 712, a combiner 716, and a digital clock generator 720. The deterministic value generator 712 generates a nominal value ($H_O$) 714 that is a function of two integers N and M that are provided as input parameters, such that the nominal value ($H_O$) 714 is a function of a division of the two integers (M/N). The nominal value ($H_O$) 714 is combined with a random value ($H_R$) 705 to generate the randomized half-cycle count value (H) 718 used by the digital clock generator 720 to generate the whitened clock 125. The whitened clock (CLK) 125 is a function of the randomized half-cycle count value (H) 718 and the input oscillation signal (OSC) 316 (e.g., CLK=f(H, OSC).) The random value ($H_R$) 705 is generated by random value generator 122 as a random value having a random sign (e.g., positive or negative). The random value generator 122 also receives error control parameters 312 that can be utilized to constrain the variability allowed in the random value ($H_R$) 705 thereby constraining variations in the resulting whitened clock 125. For example, variations in the random value ($H_R$) 705 can be constrained such that errors in the period and/or phase of the resulting whitened clock 125 are constrained within predetermined limits.

It is noted that the digital clock generator 720 can be configured to output a clock edge every "H" half cycles of the base input clock signal provided by the oscillation signal (OSC) 316, where H is the randomized half-cycle count value (H) 718. For such an embodiment, the random value ($H_R$) 705 adjusts the nominal value ($H_O$) 714 by a varying amount so that the resulting randomized half-cycle count value (H) 718 that determines the number of half cycles includes random variations. The error control parameters 312 can include a maximum clock period error relative to an ideal output clock in terms of allowed variations for the random value ($H_R$) 705 and thereby for the randomized half-cycle count value (H) 718. As such, if the random H value ($H_R$) 705 would cause an clock period error that exceeds the maximum error set by the error control parameters 312, the random H value ($H_R$) 705 can be constrained. Similarly, the error control parameters 312 can also include a maximum clock phase error relative to an ideal output clock in terms of allowed variations for the random value ($H_R$) 705 and thereby for the randomized half-cycle count value (H) 718. As such, if the random H value ($H_R$) 705 would cause a clock phase error that exceeds the maximum phase error set by the error control parameters 312, the random H value ($H_R$) 705 can be constrained.

It is further noted that the random value generator 122 can utilize a random number generator to generate the random value ($H_R$) 705. As indicated above, a random number generator can be implemented using a LFSR configured to generate a random sequence of numbers. For one embodiment, the least significant bit (LSB) of a 16-bit LSFR can be can be used to add one (e.g., LSB=1) or subtract one (e.g., LSB=0) from the random value ($H_R$) 705 each cycle to generate desired random variations within the resulting randomized half-cycle count value (H) 718. The error control parameters 312 can be used to constrain the maximum positive and negative values for the random value ($H_R$) 705. For example, a maximum positive/negative constraint parameter can be used to set the maximum positive and negative values for the random value ($H_R$) 705, and the random value ($H_R$) 705 can be set to the maximum values if they are exceeded. Further, a maximum positive/negative phase constraint parameter can be used to set maximum positive and negative phase values for the random value ($H_R$) 705, and the random value ($H_R$) 705 can be set to positive one or negative one if they are exceeded. It is further noted that the sequence of random numbers generated by the LFSR will repeat after some number of cycles. However, enough random variations are still being introduced so that interference generated by the whitened clock 125 would be seen as white noise. Thus, as used herein, "random" is not intended to mean ideally random variations that do not repeat but refers to introduced variations that generate a white noise effect even though these variations may repeat after some interval.

Figure 9:
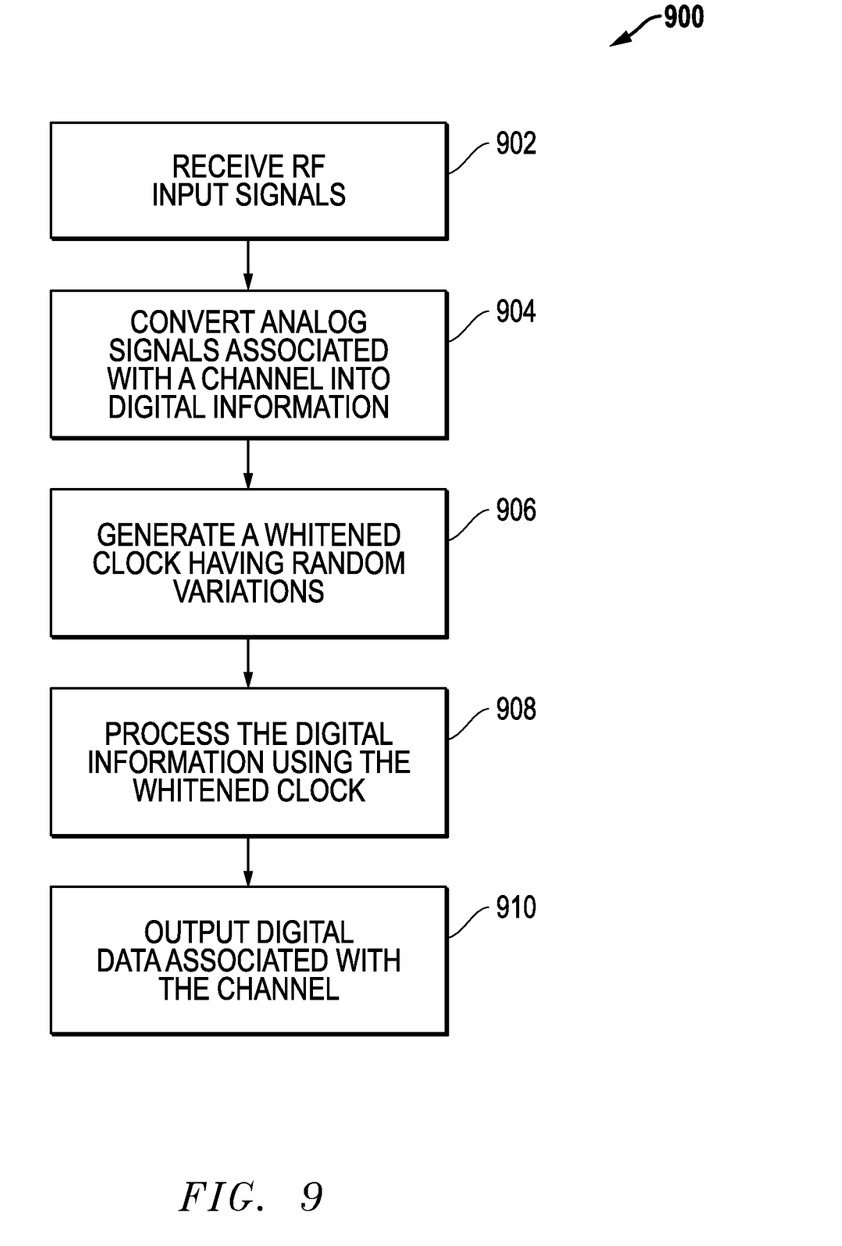
FIG. 9 is a process flow diagram of an embodiment for whitened digital processing of digital information within a receiver system.

FIG. 9 is a process flow diagram of an embodiment 900 for whitened digital processing of digital information within a receiver system. In block 902, RF input signals are received by the receiver system. In block 904, analog signals associated with a channel within the RF input signals are converted to digital information. In block 906, a whitened clock is generated that has random variations. In block 908, the digital information is processed using the whitened clock. In block 910, digital data associated with the channel is then output. The digital data can then be processed by additional processing blocks, as desired. Further, the receiver system that performs the blocks shown for embodiment 900 can be integrated within a single integrated circuit.

It is noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A receiver system having whitened digital processing, comprising:
   a radio frequency (RF) front-end configured to receive RF input signals and to output analog signals associated with a channel within the RF input signals;
   digital receive path circuitry configured to receive the analog signals, to convert the analog signals into digital information, to process the digital information, and to output digital data associated with the channel, the digital receive path circuitry comprising:
      a whitened clock generator configured to generate a whitened clock having random variations, the whitened clock generator comprising:
         a randomizer configured to provide random values; and
         a clock generator configured to receive the random values and to output the whitened clock, the clock generating comprising a nominal clock control block configured to generate nominal control parameters, a combiner configured to combine the nominal control parameters with the random values to generate whitened control parameters, and a digital clock generator configured to output the whitened clock based upon the whitened control parameters; and
      a digital processing block configured to operate based upon the whitened clock;
   wherein the RF front-end and the digital receive path circuitry are integrated within a single integrated circuit.

2. The receiver system of claim 1, further comprising one or more additional receive paths configured to receive RF input signals.

3. The receiver system of claim 2, wherein at least one of the additional receive paths is configured to loop at least a portion of the RF input signals through to an external interface for the integrated circuit.

4. The receiver system of claim 1, wherein the digital receive path circuitry is further configured to output a whitened output clock to an external interface for the integrated circuit, the whitened output clock being based upon the whitened clock.

5. The receiver system of claim 1, wherein the digital processing block comprises a buffer coupled to a digital processor.

6. The receiver system of claim 5, wherein the buffer is configured to receive input data based upon a data input clock and to output buffered data based upon the whitened clock.

7. The receiver system of claim 6, wherein the input data comprises digital data output by an analog-to-digital converter, and wherein the digital processor is configured to receive the buffered data and to operate based upon the whitened clock.

8. The receiver system of claim 6, wherein the input data comprises digital data output by the digital processor, and wherein the buffered data is provided to an external interface for the integrated circuit.

9. The receiver system of claim 5, wherein the buffer is configured to receive input data based upon the whitened clock and to output buffered data based upon a data output clock.

10. The receiver system of claim 9, wherein the buffered data is coupled to a digital-to-analog converter configured to operate based upon the data output clock.

11. The receiver system of claim 1, wherein the randomizer comprises a random number generator and an integrator.

12. The receiver system of claim 1, wherein the randomizer is configured to receive error control parameters configured to constrain the random value.

13. The receiver system of claim 12, wherein the error control parameters comprise at least one of a clock period constraint parameter and a clock phase constraint parameter.

14. The receiver system of claim 1, wherein the clock generator is configured to output a divided clock signal that is a divided version of an input clock signal, the divided clock signal being based upon a selected number of half cycles of the input clock signal.

15. The receiver system of claim 14, wherein the randomizer is configured to generate random numbers, and wherein the clock generator is configured to combine the random numbers with nominal values to whiten the selected number of half cycles as the clock generator operates.

16. A method for whitened processing of digital information within a receiver system, comprising:
   receiving radio frequency (RF) input signals;
   converting the analog signals associated with a channel within the RF input signals into digital information;
   generating a whitened clock having random variations;
   processing the digital information using the whitened clock; and
   outputting digital data associated with the channel;

wherein the receiving, converting, generating, processing, and outputting steps are performed within a single integrated circuit; and wherein the generating step comprises:
- generating random values;
- generating nominal control parameters;
- combining the nominal control parameters with the random values to generate whitened control parameters; and
- applying the whitened control parameters to a digital clock generator to generate the whitened clock based upon the whitened control parameters.

17. The method of claim 16, further comprising receiving RF input signals using multiple receive paths within the single integrated circuit.

18. The method of claim 16, further comprising outputting a whitened output clock to an external interface for the integrated circuit, the whitened output clock being based upon the whitened clock.

19. The method of claim 16, wherein the processing step comprises using a buffer and a digital processor to process the digital information.

20. The method of claim 19, further comprising using the buffer to receive input data based upon a data input clock and using the buffer to output buffered data based upon the whitened clock.

21. The method of claim 20, further comprising using digital data from an analog-to-digital converter to provide the input data to the buffer, using the digital processor to receive the buffered data, and operating the digital processor based upon the whitened clock.

22. The method of claim 20, further comprising using digital data from the digital processor to provide the input data to the buffer, and providing the buffered data to an external interface for the integrated circuit.

23. The method of claim 19, further comprising using the buffer to receive input data based upon the whitened digital clock and to output data based upon a data output clock.

24. The receiver system of claim 23, further comprising providing the buffered data to a digital-to-analog converter and operating the digital-to-analog converter based upon the data output clock.

25. The method of claim 16, further comprising utilizing a randomizer including a random number generator and an integrator to generate the random values.

26. The method of claim 16, further comprising applying error control parameters to constrain the whitened control parameters.

27. The method of claim 16, wherein the generating step comprises generating a divided clock signal that is a divided version of an input clock signal, the divided clock signal being based upon a selected number of half cycles of the input clock signal.

* * * * *

UNITED STATES PATENT AND TRADEMARK OFFICE
CERTIFICATE OF CORRECTION

| | | |
|---|---|---|
| PATENT NO. | : 9,042,499 B2 | Page 1 of 1 |
| APPLICATION NO. | : 14/062958 | |
| DATED | : May 26, 2015 | |
| INVENTOR(S) | : Michael R. May et al. | |

It is certified that error appears in the above-identified patent and that said Letters Patent is hereby corrected as shown below:

In the claims,

In claim 1, column 9, line 60, delete "generating" and insert --generator--.

In claim 16, column 10, line 62, delete "the".

Signed and Sealed this
First Day of March, 2016

Michelle K. Lee
*Director of the United States Patent and Trademark Office*